(12) United States Patent
Hori

(10) Patent No.: US 6,356,549 B1
(45) Date of Patent: Mar. 12, 2002

(54) DIGITAL SWITCHING EQUIPMENT

(75) Inventor: Yoshihiro Hori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/179,560

(22) Filed: Oct. 27, 1998

(30) Foreign Application Priority Data

Oct. 29, 1997 (JP) .............................. 9-297354

(51) Int. Cl.$^7$ .......................... H04L 12/00; H04Q 11/00
(52) U.S. Cl. ..................................... 370/364; 710/102
(58) Field of Search ................................ 370/360, 364, 370/375, 376, 389, 437, 438, 439, 254, 258; 710/100, 101, 102, 113, 117, 126, 127, 128

(56) References Cited

U.S. PATENT DOCUMENTS

| | | | | |
|---|---|---|---|---|
| 4,601,029 A | * | 7/1986 | Hargrave et al. | ............ 370/362 |
| 4,641,300 A | * | 2/1987 | Wurst | .......................... 370/362 |
| 5,483,518 A | * | 1/1996 | Whetsel | ...................... 370/364 |
| 5,526,344 A | * | 6/1996 | Diaz et al. | .................. 370/362 |
| 5,812,553 A | * | 9/1998 | Pinault et al. | .............. 370/419 |

FOREIGN PATENT DOCUMENTS

JP          5-64242          3/1993

* cited by examiner

*Primary Examiner*—Ajit Patel
(74) *Attorney, Agent, or Firm*—Whitam, Curtis & Christofferson, P.C.

(57) ABSTRACT

The present invention realizes a digital switching equipment provided with an extra PCM highway without an unnecessary increase in the capacity of the time division switch. A time division switch is provided with first PCM highways connected to all card slots and a second highway connected to a predetermined card slots. Each of all the card slots have a function of outputting first address setting signal signifying an initial time slot position of the card slots capable of using the first PCM highways. Each of the predetermined card slots, to which the second PCM highway is connected, has a function of outputting a second address setting signal signifying an initial time slot position of the card slots capable of the second PCM highway can use.

4 Claims, 6 Drawing Sheets

DIGITAL SWITCHING EQUIPMENT

BACKGROUND OF THE INVENTION

1. Field of the Invention

The present invention relates to a digital switching equipment, and more particularly, to a digital switching equipment provided with an extra PCM (Pulse Coded Modulation) highway connecting between a card shelf, which mounts electronic circuit cards of a line or trunk interface such as a line circuits card or a trunk circuits card, and a time division switch.

2. Description of the Related Art

The speech path subsystem of the digital switching equipment is constituted by a line circuit or a trunk circuit, which is an interface circuit with a subscriber terminal connected by a subscriber line or an interface circuit with other switching equipment connected by a transmission line, and the time division switch which exchanges voice or data in a time slot between an input time slots stream and an output time slots stream in accordance with necessary routing control performed by a central control unit of the digital switching equipment. The PCM highway is a junction line connecting the line circuit or the trunk circuit with the time division switch, and carries time slots stream between line circuit or trunk circuit and the time division switch.

FIG. 4 is a conceptual drawing showing physical connection arrangement of the speech path subsystem of the digital switching equipment. A card 101, 10N, 201 or 20N is the line circuits or the trunk circuits, and a plurality of such cards are mounted in a shelf 10 or 20 which is provided with a plurality of slots for insertion of cards. Voice or data of a group of cards in one shelf is transferred to the time division switch by one PCM highway HW1 or HW5, and the time slot allocation in the PCM highway is predetermined in accordance with the mounting position of card (or slot number of the shelf). It means that the PCM highway number is corresponding to the shelf and the time slot number in a PCM highway is corresponding to the mounting position of the line circuit or the trunk circuit in a shelf. Usually, one card consists of the plural number of line circuits or trunk circuits.

FIGS. 5(a) to (c) are also conceptual drawings showing examples of correspondence between the time slot number in the PCM highway and mounting position in the shelf.

FIG. 5(a) shows an example that one card consists of three circuits of line circuit or trunk circuit, ten cards are mounted on a shelf, and the PCM highway has 30 time slots of communication channel (time slot number 0 and 16 are used for control signal and not used for communication channel). Correspondence between time slot number of the PCM highway and mounting position of card is predetermined as shown in FIG. 5(a), i.e., the time slot number 1, 2 and 3 of the PCM highway are allocated to the card (one time slot for respective circuit in the card) inserted in the slot number 0 of the shelf. Therefore, when all ten cards are fully mounted on the shelf, all time slots of the PCM highway are fully used.

However, when the card consisting six circuit is used, correspondence between time slot number of the PCM highway and mounting position of card becomes as shown in FIG. 5(b), i.e., the time slot number 1 to 6 are allocated to the card inserted in the slot number 0, and it is prohibited to use slot number 1, 3, 5, 7 and 9. FIG. 5(c) shows the case where the card is more integrated and one card consists of nine circuits. In this case, three cards of nine-circuit type and one card of three-circuit type are mounted on the shelf using slot numbers 0, 3, 6 and 9, and other slots are prohibited to use.

As described above, when some of cards, integrated a large number of circuits, are mounted on the shelf and all time slots of the PCM highway are used by them, other cards cannot be mounted in the remaining slots even if these slots are vacant.

To solve this problem, there is proposed a digital switching equipment with a system for extending a PCM highway. The digital switching equipment of this type is, as disclosed in Japanese Unexamined Patent Application No. 5-64242, is characterized in that double PCM highways are connected to all card slots of a predetermined card slot group, respectively, and the selection of the double PCM highways is set by a selection setting switch.

FIG. 6 is a block diagram showing an example of the digital switching equipment of this type. The digital switching equipment has a time division switch 202 for switching time slots of PCM highways 201 and card slots 204 of card shelf are connected to the PCM highways 201. A card 203 consisting the plural number of line circuits or trunk circuits is inserted into the card slot for mounting on the card shelf. In the digital switching equipment, various types of timing signals are distributed from the time division switch 202 to all or a predetermined number of a plurality of card slot groups 205 each consisting of a plurality of card slots 204 by multiple-connection, and double PCM highways 201 are allotted to at least one of the plural card slot groups 205. The card, inserted into the card slot 204 of the card slot group 205 to which double PCM highways are allotted, is provided with a setting means of logical card slot position number. When all time slots of one PCM highway are used by other card in the card slot group, the card can set the logical card position number to select a time slot number to be used in other PCM highway and the card is inserted into a vacant card slot of the card slot group.

However, the digital switching equipment of this type has a problem that the capacity of the time division switch cannot be effectively utilized. Due to double PCM highways allocation to the same card slot, the extra PCM highway is allotted to the card slots which has used the first PCM highway. It means that there are time slots which cannot be actually used, and if the digital switching equipment is a large-scale switching equipment, there remains a number of time slots which are not effectively used and the time division switch becomes inappropriately larger in size, thereby causing a hike in costs.

SUMMARY OF THE INVENTION

It is an object of the present invention to realize a digital switching equipment provided with an extra PCM highway without an unnecessary increase in the capacity of the time division switch and without the need for the operation of the setting switch by operators.

A digital switching equipment provided with an extra PCM highway comprises a first PCM highway, which is connecting all card slots of a card shelf and a time division switch, and a second PCM highway, which is connecting predetermined card slots of the card shelf and a time division switch, for carrying digital information between line/trunk circuit and the time division switch, address setting means for providing one of first and second address information in each card slot of the card shelf, and selecting means, which is provided in each of line/trunk circuits, for selecting time slots of the first PCM highway when the first address information is provided, and selecting time slots of the second PCM highway when the second address information is provided.

Address setting means further comprises second address information setting means in the predetermined slot, to which the second PCM highway is connected, for outputting a second address information.

Line/trunk circuit according to the present invention comprises an address indicator for indicating second address information when the second address information is provided by the address setting means and for indicating first address information when the second address information is not provided by the address setting means, a highway selector for selecting and connecting a speech circuit of the line/trunk circuit to one of first and second PCM highways according to information indicated by the address indicator, and an address comparator for comparing address information on an address bus of a central control unit of the digital switching equipment to an address information provided by the address indicator, and for allowing the central control unit to access to a CPU of the line/trunk circuit when both address information are coincide with each other.

The address setting means comprises a address setting circuit which provides one of first and second address information in accordance with an instruction of a central control unit of the digital switching equipment.

BRIEF DESCRIPTION OF THE DRAWINGS

FIG. 5(a) shows an example of three-circuits type card mounting, FIG. 5(b) shows an example of six-circuits type card mounting, and FIG. 5(c) shows an example of nine-circuits type card mounting.

DETAILED DESCRIPTION OF PREFERRED EMBODIMENTS

Preferred embodiments of the present invention will be described in detail with reference to the attached drawings.

Figure 1:
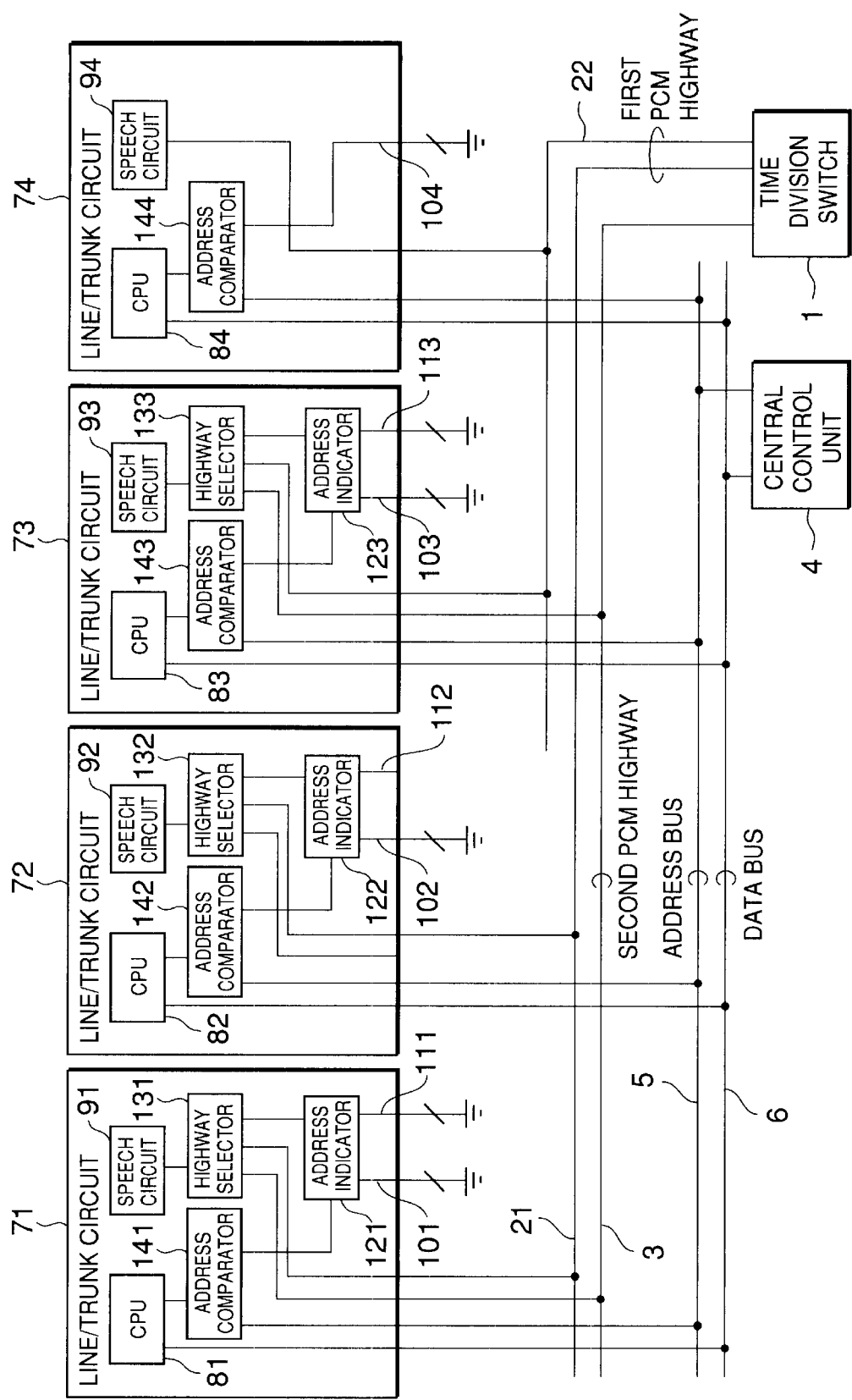
FIG. 1 is a block diagram showing one embodiment of the present invention.

FIG. 1 is a block diagram showing one embodiment of the present invention, and the speech path subsystem of the digital switching equipment is shown in this drawing. The time division switch 1 (to be referred to as "TDSW" hereinafter) has an extra PCM highway (second PCM highway 3) n addition to first PCM highways 21 and 22, and connected with line/trunk circuits 71 to 74. A central control unit 4 controls line/trunk circuits 71 to 74 through an address bus 5 and a data bus 6.

The first PCM highways 21 and 22 are conventional PCM highways employed in the digital switching equipment prior to the present invention, and the second PCM highway is an extension PCM highway which becomes available by the present invention. Line/trunk circuits 71 to 74 are either of the line circuit or the trunk circuit, and only one circuit is shown as an example although a plural number of circuits are contained in one card.

There are different type of cards are shown in FIG. 1. The line/trunk circuit 74 is a conventional line/trunk circuit which can only use the first PCM highway 22, and the line/trunk circuits 71 through 73 are line/trunk circuits capable of using the first PCM highways 21, 22 or the second PCM highway 3 depending on the slot position to which the card is inserted.

In FIG. 1, it is assumed that the line/trunk circuits 71 and 73 use the second PCM highway 3, and the line/trunk circuits 72 and 74 use the first PCM highways 21 and 22, respectively. The line/trunk circuits 71 to 74 have CPUs 81 to 84 for controlling the line/trunk circuit, and speech circuits 91 to 94 for providing speech path interface. Address indicators 121 to 123, to which first address setting signals 101 to 103 and second address setting signals 111 to 113 are connected, respectively, form address information signifying into which slots the line/trunk circuits 71 through 73 are inserted. The address indicators 121 to 123 transmit address information to the address comparators 141 to 143, respectively. The address comparators 141 to 143 compare this address information with the address information transferred by the central control unit 4 through the address bus 5 for checking their coincidence. Highway selectors 131 to 133 have a selecting function for selecting either of the first PCM highway 21 or 22 or the second PCM highway, and connects the selected PCM highway to the speech circuit.

Figure 2:
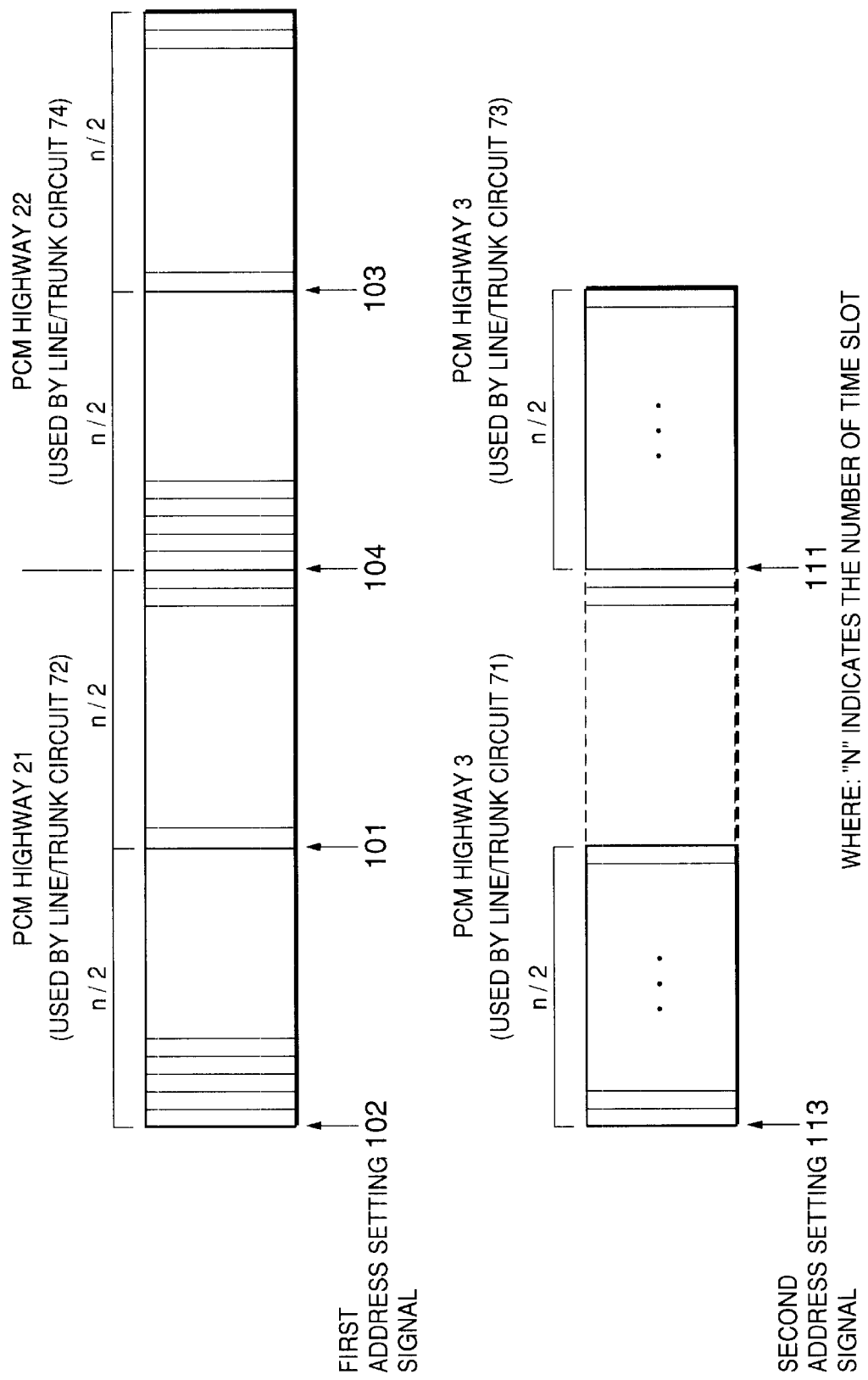
FIG. 2 is an example of how time slots are used in one embodiment of the present invention.

The operation of the present invention shown in FIG. 1 will be described with reference to FIG. 2.

The address indicators 121 to 123 control the highway selectors 131 to 133 to use the second PCM highway 3 if second address setting signals 111 to 113 are input, respectively, and control the highway selectors 131 to 133 to use the first PCM highways 21 and 22 if the second address setting signals 111 to 113 are not input, respectively.

The second PCM highway 3 is used for the card slots into which the line/trunk circuits 71 and 73 are inserted since the second address setting signals 111 and 113 are input to those circuits as shown in FIG. 1. On the other hand, the first PCM highways 21 and 22 are used for the card slots into which the line/trunk circuits 72 and 74 are inserted since the second address setting signal is not input. With respect to the line/trunk circuit 74, this circuit is not provided with an address indicator and only the first PCM highway 22 can be used. The circuit like the line/trunk circuit 74 is a conventional circuit which is not provided with the address indicator of the present invention.

Moreover, the address indicators 121 to 123 indicate address information given by the second address setting signal if the second address setting signals 111 to 113 are input, respectively, and indicate address information given by the first address setting signals 101 to 103 if the second address setting signal is not input, respectively.

Since the second address setting signals are input to the card slots into which the line/trunk circuits 71 and 73 are inserted, address information given by the second address signals 101 and 103 is indicated for those card slots. On the other hand, since the second address setting signal is not input to the card slots into which the line/trunk circuits 72 and 74 are inserted, address information given by the first address signals 102 and 104 is indicated for those card slots.

In the line/trunk circuit 74 of the conventional circuit, the first address setting signal 104 serves as address information.

The address comparators 141 to 144 have a function of comparing the value of the address bus 5 output from the Central control unit 4 with address information indicated by the address indicator, and when the comparison result is coincide with each other, the CPUs 81 to 84 of the line/trunk circuits 71 to 74 are allowed to handle data on the data bus 6.

The first address setting signals 101 to 104 correspond to the leading numbers of the time slots of the first PCM highways 21 and 22, respectively. The second address setting signals 111 to 113 correspond to the leading numbers of the time slots 3 of the second PCM highway.

If the line/trunk circuit 71 is a line/trunk circuit using n/2 time slots (where "n" is the number of time slots provided for each PCM highway), the line/trunk circuit 71 inputs/outputs PCM data to/from the first half of n time slots of the second PCM highway 3 and thus can control the Central control unit 4 corresponding to those time slots.

Likewise, if the line/trunk circuit 73 is a line/trunk circuit using n/2 time slots, the line/trunk circuit 73 inputs/outputs PCM data to the second half of n time slots of the second PCM highway and thus can control the Central control unit 4 corresponding to those time slots.

If the line/trunk circuit 72 is a line/trunk circuit using n time slots, the line/trunk circuit 72 inputs/outputs PCM data to n time slots of the first PCM highway 21 and thus can control the Central control unit 4 corresponding to respective time slots.

Likewise, if the line/trunk circuit 74 is a line/trunk circuit using n time slots, the line/trunk circuit 74 inputs/outputs PCM data to n time slots of the first PCM highway 22 and can control the Central control unit 4 corresponding to respective time slots.

More detail embodiment according to the present invention will now be described.

In the mode of the embodiment shown in FIG. 1, the first PCM highways 21 and 22 and the second PCM highway 3 have 32 time slots, respectively. The first address setting signals 101 to 104, and the second address setting signals 111 and 113 are a plurality of (5, for example) signal lines, which are pulled up within the line/trunk circuits 71 through 73 and are connected to the earth level or unconnected (or opened) depending on the card slots of the line/trunk circuits 71 to 74. The address indicators 121 to 123 output values of the second address setting signals 111 to 113 to the address comparators 141 to 143, and output L level to the PCM highway selectors 131 to 133, respectively, if any one of the second address signals 111 to 113 is at low level. If all of the second address setting signals 111 to 113 are at H level, the address indicators 121 to 123 output the first address setting signals 101 to 103 to the address comparators 141 to 143, and output H level to the PCM highway selectors 131 to 133, respectively. The PCM highway selectors 131 to 133 inputting/outputting data to/from the first PCM highways 21 and 22 if at high level, and for inputting/outputting data to/from the second PCM highway 3 if at low level.

The line/trunk circuits 71, 72, 73 and 74 use 16, 32, 16 and 32 time slots, respectively.

The line/trunk circuit 71 can use the first half of 16 time slots of the second PCM highway 3, the line/trunk circuit 72 can use 32 time slots of the first PCM highway 21, the line/trunk circuit 73 can use the second half of 16 time slots of the second PCM highway 3 and the line/trunk circuit 74 can use 32 time slots of the first PCM highway 22.

The second embodiment according to the present invention will be described with reference to FIG. 3.

Figure 3:
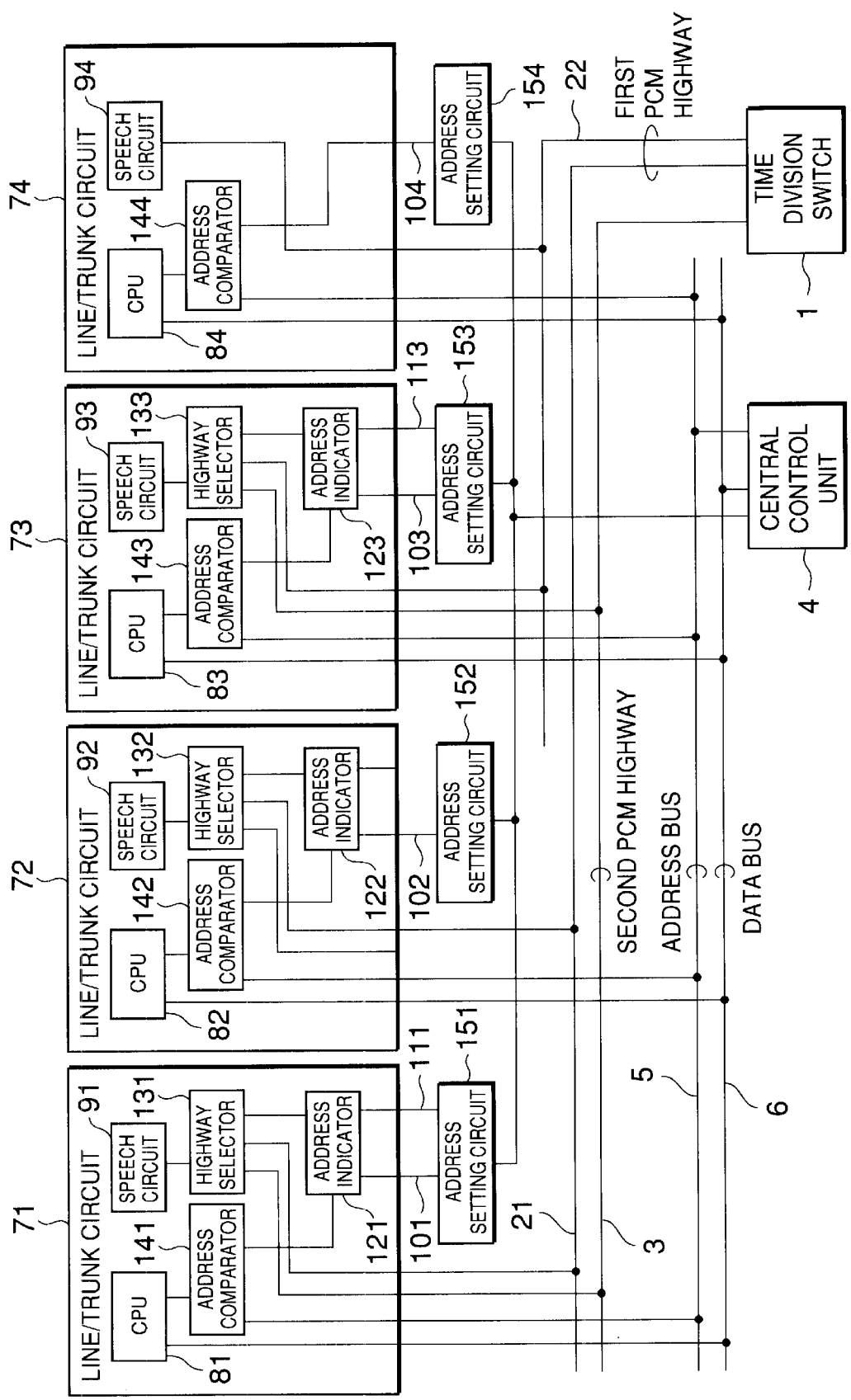
FIG. 3 is a block diagram showing another embodiment of the present invention.
Figure 4:
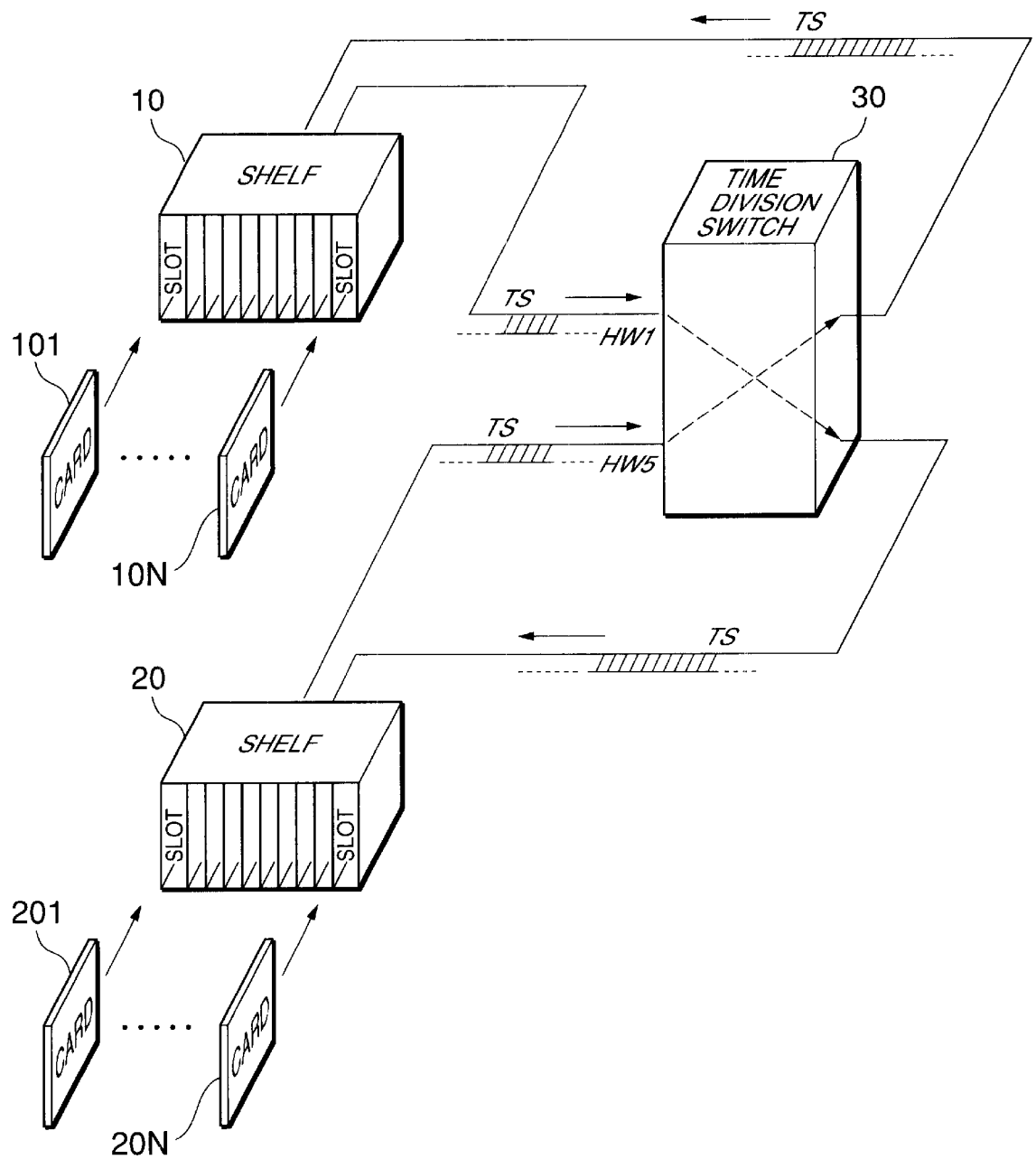
FIG. 4 is a conceptual drawing showing physical connection arrangement of the speech path subsystem of the digital switching equipment.
Figure 5A:
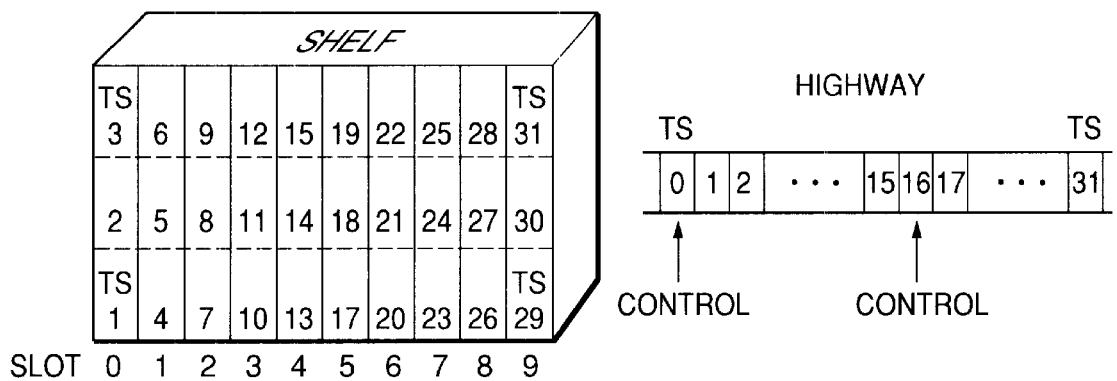
FIGS. 5(a) to (c) are conceptual drawings showing examples of correspondence between the time slot number in the PCM highway and mounting position in the shelf.
Figure 5B:
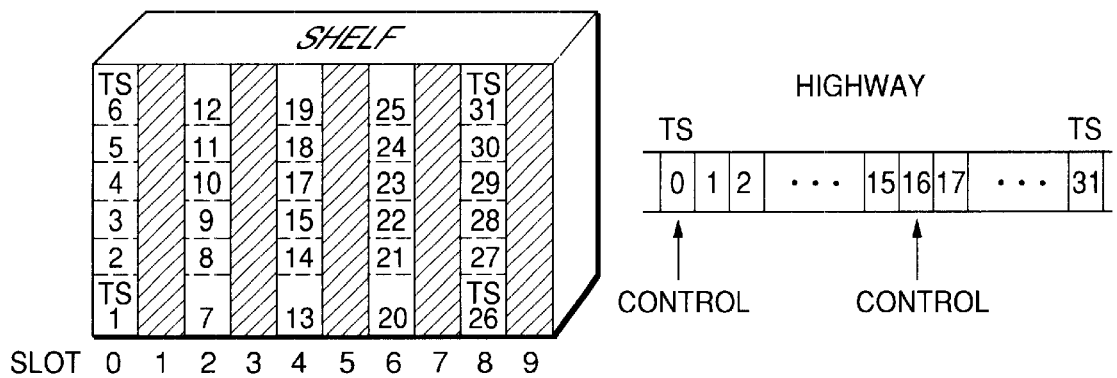
Figure 5C:
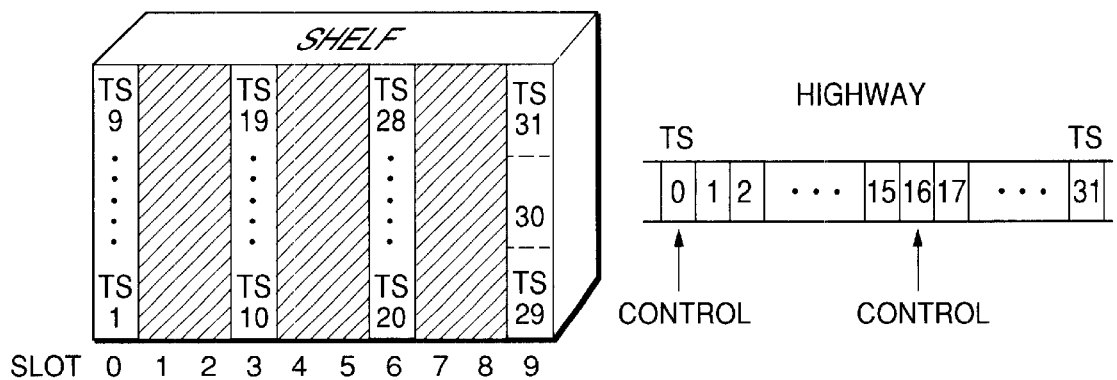
Figure 6:
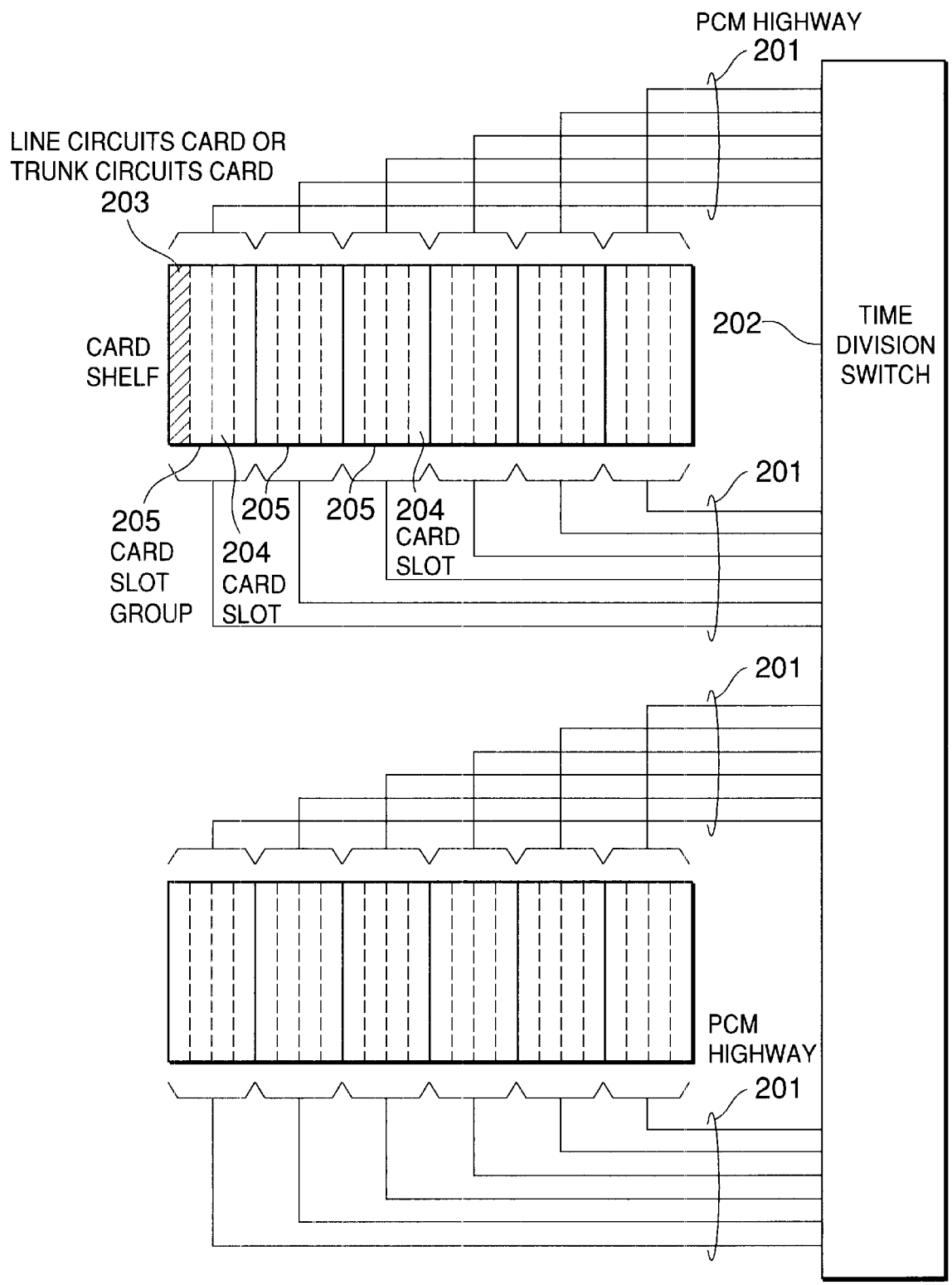
FIG. 6 is a block diagram showing an example of the digital switching equipment provided with the conventional double PCM highways arrangement.

As shown in FIG. 3, there are provided a TDSW 1, first PCM highways 21 and 22, a second PCM highway 3, a Central control unit 4, an address bus 5, a data bus 6, line/trunk circuits 71 through 74, first address setting signals 101 to 104 and second address setting signals 111 and 113 as in the case of FIG. 1.

Each of the address setting circuits 151 to 154 has a function of capable of setting the address setting signals 101 to 104 and the second address setting signals 111 and 113 which were fixed in case of FIG. 1 with the control by the Central control unit 4. This function enables the line/trunk circuits to use the time slots of the PCM highway more effectively.

If, for example, the line/trunk circuit 73 uses 24 time slots, the line/trunk circuit 71 cannot be inserted in the embodiment shown in FIG. 1. This is because the address setting signals are fixedly assigned. That is, although the leading number of the time slots used by the line/trunk circuit 71 is 17, the time slots numbered 17 through 24 are used by the line/trunk circuit 73.

In the second embodiment, if the second address setting signal numbered 113 is controlled by the address setting circuit 153 such that the leading number of the time slots used by the line/trunk circuit 71 is set to 25, it is possible to insert the line/trunk circuit 71 capable of using 8 time slots.

As described above, the present invention is capable that card slots can be effectively used without an unnecessary increase in the capacity of the time division switch, because the extension PCM highway is not connected to all of the card slots, but only to slots which are vacant but cannot be used by the PCM highways.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A digital switching equipment provided with an extra PCM highway comprising:

a first PCM highway connecting all card slots of a card shelf and a time division switch for carrying digital information between line/trunk circuit and the time division switch;

a second PCM highway connecting predetermined card slots of the card shelf and a time division switch for carrying digital information between line/trunk circuit and the time division switch;

address setting means for providing one of first and second address information in each card slot of the card shelf; and selecting means provided in each of line/trunk circuits for selecting time slots of the first PCM highway when the first address information being provided, and selecting time slots of the second PCM highway when the second address information being provided.

2. Address setting means according to claim 1 further comprising:

second address information setting means in the predetermined slot, to which the second PCM highway is connected, for outputting a second address information.

3. Line/trunk circuit according to claim 1 comprising:

an address indicator for indicating second address information when the second address information being provided by the address setting means and for indicating first address information when the second address information being not provided by the address setting means;

a highway selector for selecting and connecting a speech circuit of the line/trunk circuit to one of first and second PCM highways according to information indicated by the address indicator; and an address comparator for comparing address information on an address bus of a central control unit of the digital switching equipment to an address information provided by the address indicator, and for allowing the central control unit to access to a CPU of the line/trunk circuit when both address information being coincide with each other.

4. The address setting means according to claim 1 comprising a address setting circuit providing one of first and second address information in accordance with an instruction of a central control unit of the digital switching equipment.

* * * * *